US012579039B2

(12) United States Patent
Malkevich et al.

(10) Patent No.: US 12,579,039 B2
(45) Date of Patent: Mar. 17, 2026

(54) METHOD AND APPARATUS FOR REDUCING REPLICATION COMMUNICATIONS LOAD

(71) Applicant: Dell Products L.P., Round Rock, TX (US)

(72) Inventors: Evgeny Malkevich, Newton, MA (US); Arieh Don, Newton, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/794,287

(22) Filed: Aug. 5, 2024

(65) Prior Publication Data

US 2026/0037383 A1 Feb. 5, 2026

(51) Int. Cl.
*G06F 11/14* (2006.01)
*G06F 11/1446* (2026.01)

(52) U.S. Cl.
CPC ...... *G06F 11/1448* (2013.01); *G06F 11/1469* (2013.01); *G06F 2201/84* (2013.01)

(58) Field of Classification Search
CPC ............. G06F 11/1448; G06F 11/1469; G06F 2201/84
USPC ................................................. 711/162, 161
See application file for complete search history.

(56) References Cited

U.S. PATENT DOCUMENTS

| | | | |
|---|---|---|---|
| 9,965,216 B1 * | 5/2018 | Jaganathan | ............. G06F 3/065 |
| 2007/0094467 A1 * | 4/2007 | Yamasaki | ........... G06F 11/2082 |
| | | | 711/162 |

* cited by examiner

*Primary Examiner* — Hosain T Alam
*Assistant Examiner* — Zubair Ahmed
(74) *Attorney, Agent, or Firm* — Daly, Crowley, Mofford & Durkee, LLP

(57) ABSTRACT

A method for use in a first storage system, comprising: generating a current snapshot of a first volume that is hosted by the first storage system; when the current snapshot is a full copy of the first volume and a predetermined condition is true: identifying a first snapshot of the first volume, generating an abbreviated snapshot of the first volume corresponding to a difference between the first snapshot and the current snapshot, transmitting to a second storage system an instruction to roll back a second volume to a second snapshot, waiting to receive a confirmation that the second volume has been rolled back, and transmitting the abbreviated snapshot to the second storage system for use in updating the second volume; and when the current snapshot is not a full copy of the first volume and/or the predetermined condition is not true: transmitting the current snapshot to the second storage system.

11 Claims, 7 Drawing Sheets

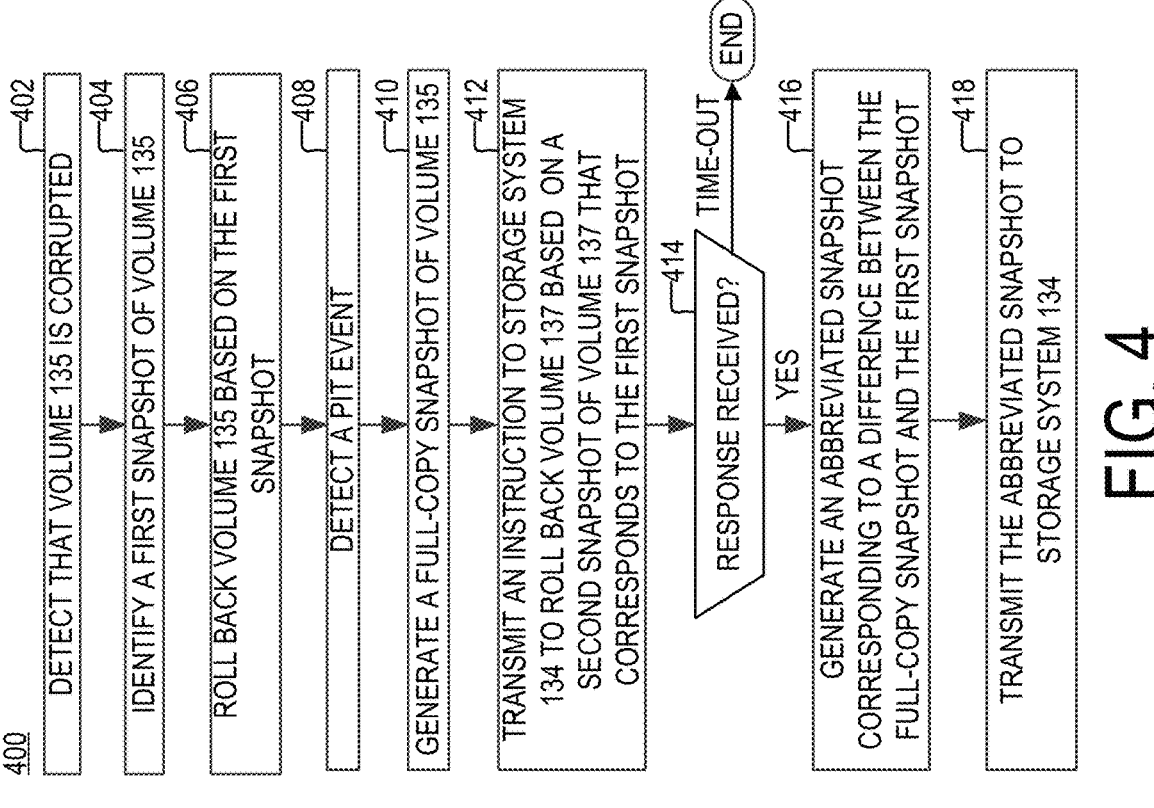

400

DETECT THAT VOLUME 135 IS CORRUPTED — 402

IDENTIFY A FIRST SNAPSHOT OF VOLUME 135 — 404

ROLL BACK VOLUME 135 BASED ON THE FIRST SNAPSHOT — 406

DETECT A PIT EVENT — 408

GENERATE A FULL-COPY SNAPSHOT OF VOLUME 135 — 410

TRANSMIT AN INSTRUCTION TO STORAGE SYSTEM 134 TO ROLL BACK VOLUME 137 BASED ON A SECOND SNAPSHOT OF VOLUME 137 THAT CORRESPONDS TO THE FIRST SNAPSHOT — 412

RESPONSE RECEIVED? — 414
TIME-OUT → END
YES

GENERATE AN ABBREVIATED SNAPSHOT CORRESPONDING TO A DIFFERENCE BETWEEN THE FULL-COPY SNAPSHOT AND THE FIRST SNAPSHOT — 416

TRANSMIT THE ABBREVIATED SNAPSHOT TO STORAGE SYSTEM 134 — 418

DETECT THAT VOLUME 135 IS CORRUPTED — 302

IDENTIFY A SNAPSHOT OF VOLUME 135 — 304

ROLL BACK VOLUME 135 BASED ON THE IDENTIFIED SNAPSHOT — 306

DETECT A PIT EVENT — 308

GENERATE A FULL-COPY SNAPSHOT OF VOLUME 135 — 310

TRANSMIT THE FULL-COPY SNAPSHOT OF VOLUME 135 TO STORAGE SYSTEM 134 — 312

FIG. 3

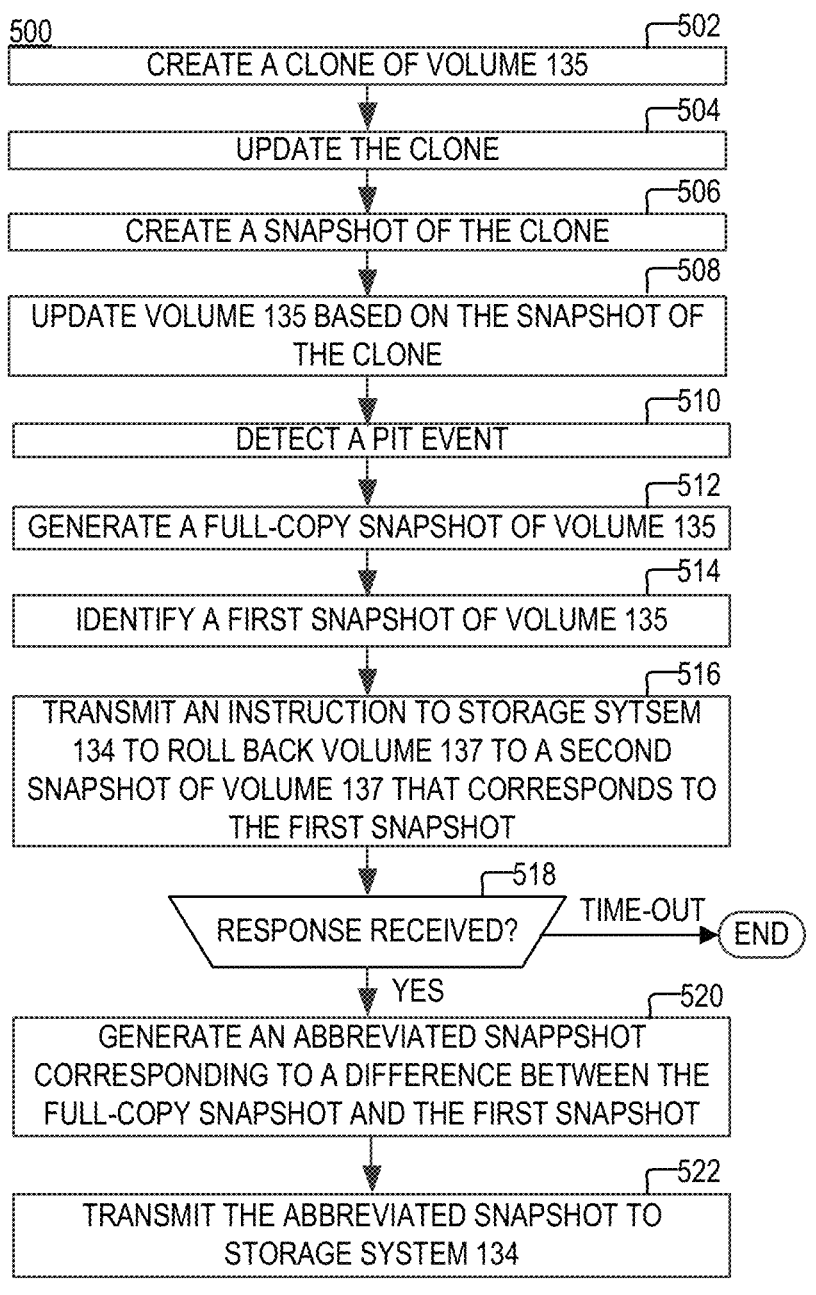

500

502
CREATE A CLONE OF VOLUME 135

504
UPDATE THE CLONE

506
CREATE A SNAPSHOT OF THE CLONE

508
UPDATE VOLUME 135 BASED ON THE SNAPSHOT OF THE CLONE

510
DETECT A PIT EVENT

512
GENERATE A FULL-COPY SNAPSHOT OF VOLUME 135

514
IDENTIFY A FIRST SNAPSHOT OF VOLUME 135

516
TRANSMIT AN INSTRUCTION TO STORAGE SYTSEM 134 TO ROLL BACK VOLUME 137 TO A SECOND SNAPSHOT OF VOLUME 137 THAT CORRESPONDS TO THE FIRST SNAPSHOT

518
RESPONSE RECEIVED?    TIME-OUT    END

YES

520
GENERATE AN ABBREVIATED SNAPPSHOT CORRESPONDING TO A DIFFERENCE BETWEEN THE FULL-COPY SNAPSHOT AND THE FIRST SNAPSHOT

522
TRANSMIT THE ABBREVIATED SNAPSHOT TO STORAGE SYSTEM 134

FIG. 5

INPUT/OUTPUT (I/O) DEVICE 720

VOLATILE MEMORY 704

PROCESSOR 702

GUI 708

NON-VOLATILE MEMORY 706

COMPUTER INSTRUCTIONS 712

OPERATING SYSTEM 716

DATA 718

700

METHOD AND APPARATUS FOR REDUCING REPLICATION COMMUNICATIONS LOAD

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method for use in a first storage system is provided, comprising: generating a current snapshot of a first volume that is hosted by the first storage system; when the current snapshot is a full copy of the first volume and a predetermined condition is true: identifying a first snapshot of the first volume, generating an abbreviated snapshot of the first volume corresponding to a difference between the first snapshot and the current snapshot, transmitting to a second storage system an instruction to roll back a second volume to a second snapshot of the second volume that corresponds to a same volume state as the first snapshot, waiting to receive a confirmation that the second volume has been rolled back, and transmitting the abbreviated snapshot to the second storage system for use in updating the second volume; and when the current snapshot is not a full copy of the first volume and/or the predetermined condition is not true: transmitting the current snapshot to the second storage system, wherein the second volume is a copy of the first volume, and the second volume is hosted by the second storage system and synchronized with the first volume by using snapshots of the first volume that are generated by the first storage system and subsequently transmitted to the second storage system.

According to aspects of the disclosure, a system is provided, comprising: generating a current snapshot of a first volume that is hosted by a first storage system; when the current snapshot is a full copy of the first volume and a predetermined condition is true: identifying a first snapshot of the first volume, generating an abbreviated snapshot of the first volume corresponding to a difference between the first snapshot and the current snapshot, transmitting to a second storage system an instruction to roll back a second volume to a second snapshot of the second volume that corresponds to a same volume state as the first snapshot, waiting to receive a confirmation that the second volume has been rolled back, and transmitting the abbreviated snapshot to the second storage system for use in updating the second volume; and when the current snapshot is not a full copy of the first volume and/or the predetermined condition is not true: transmitting the current snapshot to the second storage system, wherein the second volume is a copy of the first volume, and the second volume is hosted by the second storage system and synchronized with the first volume by using snapshots of the first volume that are generated by the first storage system and subsequently transmitted to the second storage system.

According to aspects of the disclosure, a non-transitory computer-readable medium is provided that stores one or more processor-executable instructions, which, when executed by at least one processor, cause the at least one processor to perform the operations of: generating a current snapshot of a first volume that is hosted by a first storage system; when the current snapshot is a full copy of the first volume and a predetermined condition is true: identifying a first snapshot of the first volume, generating an abbreviated snapshot of the first volume corresponding to a difference between the first snapshot and the current snapshot, transmitting to a second storage system an instruction to roll back a second volume to a second snapshot of the second volume that corresponds to a same volume state as the first snapshot, waiting to receive a confirmation that the second volume has been rolled back, and transmitting the abbreviated snapshot to the second storage system for use in updating the second volume; and when the current snapshot is not a full copy of the first volume and/or the predetermined condition is not true: transmitting the current snapshot to the second storage system, wherein the second volume is a copy of the first volume, and the second volume is hosted by the second storage system and synchronized with the first volume by using snapshots of the first volume that are generated by the first storage system and subsequently transmitted to the second storage system.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

FIG. 3 is a flowchart of an example of a process, according to aspects of the disclosure;

FIG. 4 is a flowchart of an example of a process, according to aspects of the disclosure;

FIG. 5 is a diagram of an example of an asynchronous replication manager, according to aspects of the disclosure;

DETAILED DESCRIPTION

Figure 1A:
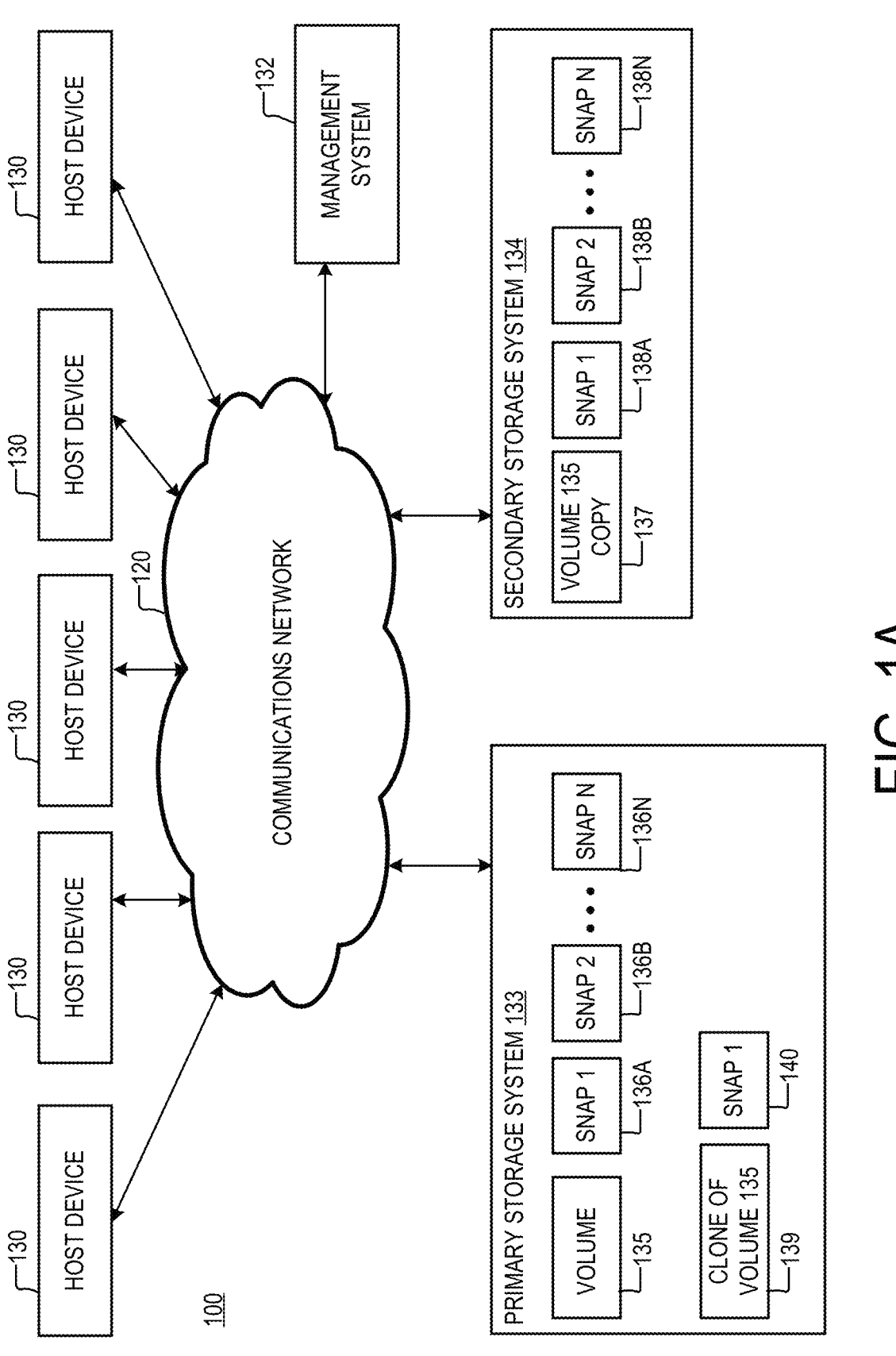
FIG. 1A is a diagram of an example of a system, according to aspects of the disclosure.

FIG. 1A is a diagram of an example of a system 100, according to aspects of the disclosure. As illustrated, system 100 may include a primary storage system 133 and a secondary storage system 134 that are coupled to a plurality of host devices 130 and a management system 132 via a communications network 120. Each of the primary storage system 133 and the secondary storage system 134 may be the same or similar to the storage system 200, which is discussed further below with respect to FIG. 1B. Each of the host devices 130 may be the same or similar to the computing device 700, which is discussed further below with respect to FIG. 7. The communications network 120 may include one or more of the Internet, a local area network (LAN), a wide area network (WAN), an InfiniBand network, a mobile data network, etc. Management system 132 may include a computing system that is used to manage storage systems 133 and 134. Management system 132 may include one or more computing devices, such as the computing device 700, which is discussed further below with respect to FIG. 7.

The primary storage system 133 may be configured to implement and/or host a volume 135. In addition, the primary storage system 133 may be configured to create snapshots 136A-N of volume 135 at predetermined time intervals. In addition, the primary storage system 133 may be configured to store a clone 139 of volume 135 and at least one snapshot of the clone 139. The secondary storage system 134 may be configured to implement and/or host a point-in-time copy 137 of volume 135. In addition, the secondary storage system 134 may be configured to store snapshots 138A-N of volume copy 137. Copy 137 of volume 135 may be a volume itself. Under the nomenclature of the present disclosure, copy 137 is also referred to as "volume 137". According to the present example, volume 135 is used for production, and volume 137 is used for backup. However, the present disclosure is not limited thereto.

In one example, volume 135 may be a database and each of the host devices 130 may be a server that is running a frontend for the database. In operation, each of the host devices 130 may be configured to execute database queries by retrieving and/or storing data in volume 135. However, it will be understood that the present disclosure is not limited to any specific implementation and/or use of volume 135 or host devices 130.

A snapshot of a volume, such as any of snapshots 136A-N, 138A-N, and 140, is a point-in-time copy of a storage volume or disk at a specific moment. It captures the entire state of the volume, including all files, folders, and metadata, allowing for quick recovery in case of data loss or corruption. Volume snapshots are commonly used in data backup and disaster recovery strategies to ensure data integrity and availability. They enable users to restore the volume to its previous state or retrieve specific files or data from the snapshot without affecting the original volume.

A snapshot of a volume may be either a full copy of a volume or a delta copy of the volume. When the snapshot is a full copy of the volume, the snapshot may contain all data that is present in the volume, and it may be the same or similar in size as the volume. On the other hand, when the snapshot is a delta copy of the volume, the snapshot may identify only changes that occurred in the volume since the creation of the last snapshot. For example, the delta copy may include any new data that has been written to the volume since the creation of the last snapshot; in addition, the delta copy may identify information (or addresses) that was deleted after the last snapshot. The delta copy of a volume is also referred to as an "incremental snapshot" or "incremental snapshot" by those of ordinary skill in the art.

Under the nomenclature of the present disclosure, a snapshot of a volume represents the state of the volume when the snapshot was created, irrespective of whether the snapshot is a full copy or a delta copy of the volume. When the snapshot is a full-copy snapshot, the snapshot alone may represent the state of the volume. When the snapshot is a delta-copy snapshot, the snapshot may represent the state of the volume when combined with other snapshots that belong in the same snapshot tree. In general, the use of delta-copy snapshots (and incremental backup) is well understood by those of ordinary skill in the art.

A discussion is now provided of the concept of "abbreviated snapshot". Consider an example in which a first snapshot of a volume is created at time t1 and a second snapshot of the volume is created at time t2. An abbreviated snapshot that corresponds to the difference between the first snapshot and the second snapshot may include (or identify) all data that was deleted from the volume in the period t1-t2; in addition, the difference may identify (or include) all data that was written to the volume in the period t1-t2. The abbreviated snapshot, in other words, can be regarded as a delta-copy snapshot of the volume in the sense that it identifies the incremental changes to the volume that occurred in the period t1-t2.

As is discussed further below with respect to FIGS. 2-6, the use of abbreviated snapshots is advantageous because it conserves network bandwidth and reduces the time it takes to synchronize the states of volumes 135 and 137. In general, an abbreviated snapshot of volume 135 may be created when a full-copy snapshot of volume 135 is generated, and is necessary to update volume 137 based on the full-copy snapshot. The abbreviated snapshot may be created based on the full-copy snapshot and other one other snapshot. The methods that are discussed with respect to FIG. 2-6 allow the abbreviated snapshot may be transmitted in lieu of the full-copy snapshot and subsequently used to update volume 137. Using an abbreviated snapshot to perform the update, rather than a full-copy snapshot, is advantageous because it can drastically reduce the network bandwidth that is needed to perform the bandwidth. The size of a full-copy snapshot may be several terabytes in some cases, whereas an abbreviated snapshot that is generated based on the full-copy snapshot may be orders of magnitude smaller.

In some implementations, an abbreviated snapshot that corresponds to the difference between the first snapshot and the second snapshot may be generated as follows. The first snapshot may be used to generate a first copy of the volume. The first copy of the volume would have the same state as the volume did at time t1 when the first snapshot was created. The first copy of the volume may be created by using existing roll-back Application Programming Interfaces (APIs). In other words, the first copy may be generated by executing a roll-back operation based on the first snapshot. As noted above, when the first snapshot is a delta copy, the roll-back operation would also utilize other (e.g., older) snapshots to restore the full state of the volume at time t1. The second snapshot may be used to generate a second copy of the volume. The second copy of the volume would have the same state as the volume did at time t2, when the second snapshot was created. The second copy of the volume may be created by using existing roll-back Application Programming Interfaces (APIs). In other words, the second copy may be generated by executing a roll-back operation based on the second snapshot. As noted above, when the second snapshot is a delta copy, the roll-back operation would also utilize earlier snapshots to restore the full state of the volume at time t2. After the first and second copy are created, the abbreviated snapshot may be obtained by identifying information that is present in the first copy, but not in the second copy, as well as information that is present in the second copy but not in the first copy.

As used herein the term "roll-back" or "roll-back operation" refers to reverting a volume to a state that is represented by the snapshot. Roll-back operations are well understood by those of ordinary skill in the art. Many storage systems provide by default APIs for performing roll-backs and are capable of executing roll-back operations when a volume is corrupted.

Continuing with the example above, the abbreviated snapshot that corresponds to the difference between the first and second snapshots may be formatted as a regular snapshot. In this regard, standard APIs for performing roll-back operations may be used to update a volume based on the abbreviated snapshot (i.e., the APIs may accept the abbreviated snapshot as one of its arguments in the same way they would accept a regular snapshot). For instance, when a roll-back operation is performed on the first copy based on the abbreviated snapshot, the result of the operation will be a copy of the volume that is identical to the second copy. It will be recalled that the first copy represents the state of the volume at time t1 and the second copy represents the state of the volume at state t2. In this regard, the execution of the roll-back operation has the effect of bringing the first copy of the volume to a forward state and, for this reason, it may also be referred to as "updating the volume".

By way of example, the phrase "updating a volume based on an abbreviated snapshot" may refer to an operation whereby a roll-back API call is made, with an identifier of the volume and an identifier of the abbreviated snapshot (instead of a regular snapshot) being used as arguments. However, the present disclosure is not limited to any specific method for updating a volume based on an abbreviated snapshot (or based on a regular delta-copy snapshot). In general, the phrase updating a volume based on a snapshot may refer to any action that causes the volume to assume the state that is represented by the snapshot.

The snapshots of volumes 135 and 137 may be interchangeable to a degree. This because volume 137 is a copy of volume 135. For example, snapshot 138B may be used to revert volume 135 to an earlier state in the same way one would use snapshot 135B. Moreover, when volume 137 lags behind the current state of volume 135, the states of volume 135 and 137 may be synchronized by updating volume 137 based on a snapshot of volume 135 that represents the current state of volume 135.

The snapshots of a volume may be given different sequence numbers. A snapshot sequence number is a unique identifier assigned to each snapshot in a series or sequence. It helps to track the chronological order of snapshots taken over time. When snapshots are created, they are often assigned sequence numbers or timestamps to indicate their relative position in the sequence. This allows users or systems to easily identify and reference specific snapshots, particularly when managing multiple snapshots of the same volume or dataset. Sequence numbers are essential for snapshot management tasks such as restoring data to a specific point in time, tracking changes over time, or implementing retention policies. They provide a clear way to organize and manage snapshots within a storage system or backup solution.

A volume clone, such as the clone 139, is a copy of an existing volume or disk that shares the same data as the original volume but is independent of it. Unlike traditional copies, which duplicate all data, a volume clone typically utilizes a copy-on-write or similar technology to create a copy that initially shares data blocks with the original volume. The key feature of a volume clone is that it allows changes made to the original volume to be tracked separately on the clone. This means that, after the clone is created, modifications to the original volume do not affect the clone, and vice versa. Volume clones are often used for tasks such as testing software updates, database maintenance, performing experiments, or creating development environments without impacting the original data. They provide a way to work with data without risking changes to the original source.

In the example, of FIG. 1A, clone 139 is a clone of volume 135 and is used to perform maintenance operations (e.g., repairing data) while incoming user requests are served out of volume 135. After the data is repaired, the contents of clone 139 may be written to volume 135. Writing the contents of clone 139 to volume 135 may cause volume 139 to store the same data as clone 139 (e.g., repaired data). In one example, the contents of clone 139 may be written to volume 135 by updating volume 135 based on the snapshot 140 of the clone 139. Snapshot 140 (alone or in combination with other snapshots of clone 139) may identify all changes that were made to clone 139 since the time it was identical to volume 135.

Figure 1B:
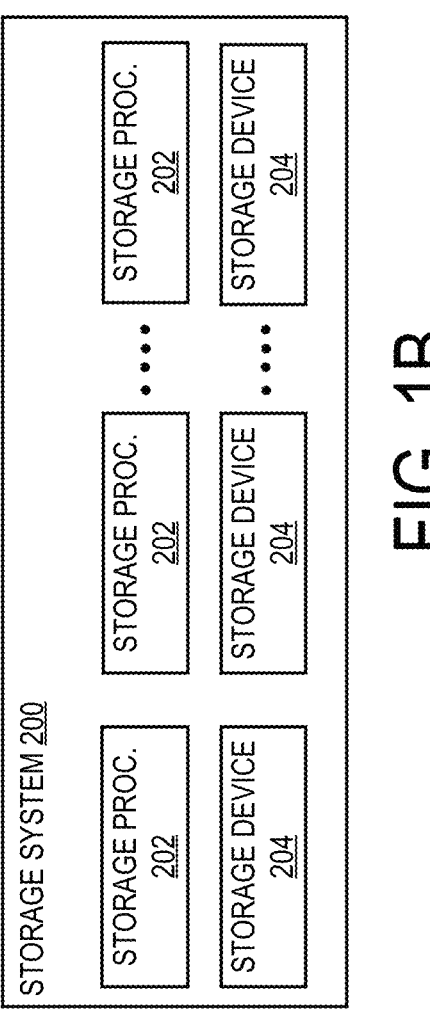
FIG. 1B is a diagram of an example of a system, according to aspects of the disclosure.

FIG. 1B is a diagram of an example of a storage system 200, according to aspects of the disclosure. The storage system 200 may include any suitable type of storage system, such as the Dell PowerMax ™ storage system. As such, the storage system 200 may include a plurality of storage processors 202 and a plurality of storage devices 204 In some implementations, each of the storage devices 204 may include a Solid-State Drive (SSD), a Non-Volatile Memory Express (NVME) device, a hard disk, and/or any other suitable type of storage device. In some implementations, each of the storage processors 202 may include a computing device, such as the computing device 700, which is discussed further below with respect to FIG. 7. Each of the storage processors may be configured to receive I/O requests from host devices 130 and fulfill those requests by reading or writing data to the storage devices 204.

Figure 2:
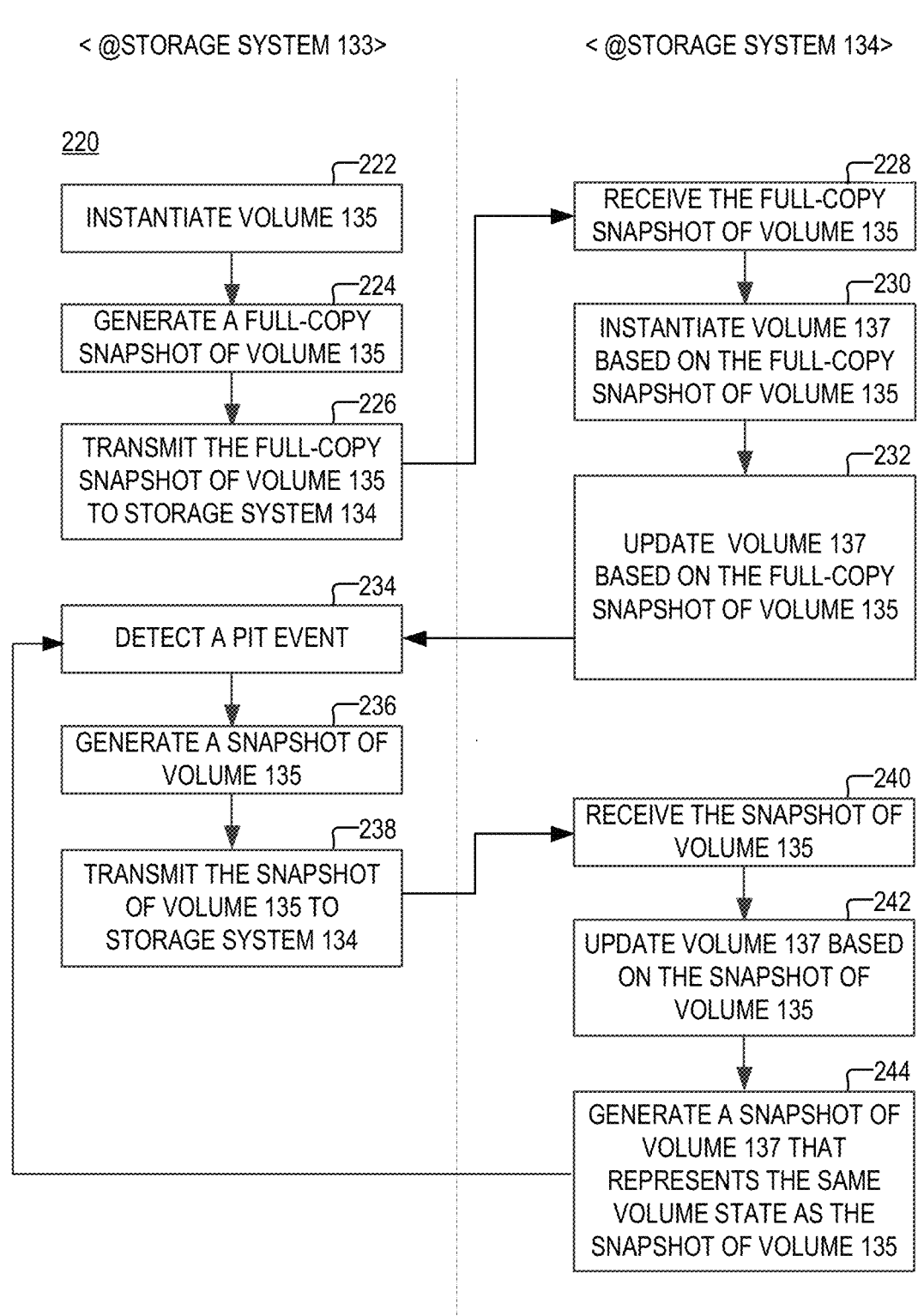
FIG. 2 is a flowchart of an example of a process, according to aspects of the disclosure.

FIG. 2 is a flowchart of an example of a process 220, according to aspects of the disclosure. At step 222, volume 135 is instantiated in storage system 133. At step 224, an initial full-copy snapshot of volume 135 is created. According to the present example, snapshot 136A is created. At step 226, the full-copy snapshot of volume 135 is transmitted to storage system 134. At step 228, the full-copy snapshot of volume 135 is received at storage system 134. At step 230, volume 137 is instantiated. At step 232, volume 137 is updated based on the received full-copy snapshot. As a result of the update, the state of volume 137 becomes identical to the state of volume 135 (when step 222 is executed). At step 234, a point-in-time (PIT) event is detected. The PIT event may be an event that is generated periodically (e.g., every 10 minutes) which drives the creation of snapshots of volume 135. At step 236, a snapshot of volume 135 is created. The created snapshot is a delta-copy snapshot. The created snapshot may be the same or similar to snapshot 136B. At step 238, the snapshot of volume 135 (created at step 236) is transmitted to storage system 134. At step 240, the snapshot of volume 135 (created at step 236) is received at storage system 134. At step 242, volume 137 is updated based on the snapshot of volume 135 (created at step 236). As a result of the update, the states of volume 137 and 135 are synchronized. Specifically, as a result of the update, the state of volume 137 becomes identical to the state of volume 135, at the time when the PIT event is detected or when step 236 is executed. At step 244, a snapshot of volume 137 is created that represents the same volume state as the snapshot created at step 236. In one example, creating the snapshot of volume 137 may include storing in storage system 134 a copy of the snapshot of volume 135 and treating it as a snapshot of volume 137. Alternatively, the snapshot of volume 137 may be created anew (e.g., before further updates are made to volume 135 other than the update at step 242).

According to the present example, two snapshots represent the same volume state when rolling back different respective volumes based on the snapshots causes the volumes to become identical. Consider an example in which a first snapshot of volume 135 represents the same volume state as a second snapshot of volume 137. According to the example, volume 135 is rolled back based on the first snapshot, and volume 137 is rolled back based on the second snapshot. As a result of the roll-back operations, volumes 135 and 137 assume identical states—i.e., volume 135 assumes a state in which it stores the same data as volume 137, and vice versa. Were the first and second snapshots not representing the same volume state, volumes 135 and 137 would not have become identical as a result of the update.

In some respects, FIG. 2 is provided to illustrate that volumes 135 and 137 are synchronized by forwarding any snapshots of volume 135 to volume 137 and updating volume 137 based on the snapshots. The forwarded snapshots may be created over the ordinary course of business of storage system 133 (i.e., snapshots that are created based on a data protection policy for volume 135). In the present example, no other synchronous or asynchronous process is used in parallel with the snapshot forwarding. The solution of FIG. 2 is less resource intensive than other methods for synchronous or asynchronous replication, and it is suitable for use in circumstances where resource conservation is desirable or when the needed resources are simply not available.

In another aspect, FIG. 2 describes a pattern in which: (i) a snapshot of volume 135 is provided to storage system 133 (at steps 236-240), (ii) the snapshot of volume 135 is used to update volume 137 (at step 242), and (iii) a snapshot of volume 137 is created (at step 242) after the update and before any additional updates are performed on volume 137. The snapshot of volume 135 that is used to update volume 137 (at step 242) and the snapshot of volume 135 that is created immediately after the update (e.g., at step 244) represent the same volume state. Furthermore, in the present example, both snapshots are given the same sequence number. In other words, the snapshot of volume 135 (created at step 236) will have the same sequence number among the snapshots of volume 135 as the snapshot of volume 137 (created at step 244) would among the snapshots of volume 137. In this regard, storage system 134 may use the sequence numbers of the snapshots of volume 137 to identify a snapshot of volume 137 that represents the same volume state as a corresponding snapshot of volume 135. However, it will be understood that the present disclosure is not limited to any specific method for tracking which snapshots of volumes 135 and 137 represent the same volume state.

FIG. 3 is a flowchart of a process 300, according to aspects of the disclosure. At step 302, storage system 133 detects that volume 135 is corrupted. At step 304, a snapshot of volume 135 is identified. In some implementations, the first snapshot may be identified based on user input identifying the volume (e.g., a keyboard input or input received over a communications network that contains an identifier of the volume). Additionally or alternatively, in some implementations, the identified snapshot may be selected by the customer after the customer has inspected available snapshots in reverse creation order to find the latest non-corrupted snapshot. At step 306, volume 135 is rolled back to the identified snapshot. At step 308, a PIT event is detected. At step 310, a full-copy snapshot of volume 135 is generated. At step 312, the full-copy snapshot is transmitted to storage system 134 where it is expected to be used for updating volume 137.

In the example of FIG. 3, the snapshot generated at step 310 is the first snapshot of volume 135 that is generated after volume 137 is rolled back. In general, the first snapshot of a volume that is generated after the volume is rolled back or updated based on a snapshot may be a full-copy snapshot and all subsequent snapshots of the volume (until a new roll-back or update) may be delta-copy snapshots that describes changes to volume 135 which are incremental with respect to the full-copy snapshot. This is standard practice in many (or some) storage systems that use snapshot data protection.

FIG. 3 is provided to illustrate one challenge in using snapshots to synchronize the states of two different volumes, such as a production volume (e.g., volume 135) and a replication volume (e.g., volume 137). The challenge is that after a roll-back is performed on the production volume, a full copy of the production volume (i.e., a full-copy snapshot) needs to be sent to the replication storage system, which can be very inefficient. The size of a full-copy snapshot may be in the order of terabytes, and transmitting such a snapshot to a replication storage system could take hours and even days. The full-copy snapshot may also include user data that is written to volume 135 after volume 135 is rolled back (at step 306).

FIG. 4 is a flowchart of an example of a process 400, according to aspects of the disclosure. At step 402, storage system 133 detects that volume 135 is corrupted. At step 404, a first snapshot of volume 135 is identified. In some implementations, the snapshot may be identified automatically (e.g., by selecting an identifier of the newest snapshot that was created at least 48 hours ago or by using any other suitable selection criterion). Additionally or alternatively, in some implementations, the first snapshot may be identified based on user input identifying the volume (e.g., a keyboard input or input received over a communications network that contains an identifier of the volume). Additionally or alternatively, in some implementations, the identified snapshot may be selected by the customer after the customer has inspected available snapshots in reverse creation order to find the latest non-corrupted snapshot. At step 406, volume 135 is rolled back based on the first snapshot. At step 408, a PIT event is detected. At step 410, a full-copy snapshot of volume 135 is created (because volume 135 was just rolled back). As noted above, additional user data may be written to volume 135 in the period starting when volume 135 is rolled back (at step 406) and ending when the full-copy snapshot is created (at step 410). At step 412, storage system 133 transmits to storage system 134 an instruction to roll back volume 137 based on a second snapshot of volume 137 that represents the same volume state as the first snapshot of volume 135. At step 414, storage system 133 waits to receive a response to the instruction (transmitted at step 412) which confirms that volume 137 has been rolled back based on the second snapshot. If the response is received, process 400 proceeds to step 416. Otherwise, if the instruction times out (or if an error is detected), process 400 ends. At step 416, an abbreviated snapshot is created that is the same as (or otherwise based on) the difference between the first snapshot of volume 135 (identified at step 404) and the full-copy snapshot of volume 135 (generated at step 410). At step 418, the abbreviated snapshot is transmitted to storage system 134. When the abbreviated snapshot is received at storage system 134, volume 137 is updated based on the abbreviated snapshot. The update may be performed in the manner discussed above.

In one example, the instruction (transmitted at step 412) may include the sequence number of the first snapshot (identified at step 404). In response to receiving the instruction, storage system 134 may identify a second snapshot that has the same sequence number and subsequently roll back volume 137 based on the second snapshot. As discussed above with respect to FIG. 2, in one implementation, the snapshot generation processes of storage systems 133 and 134 may be synchronized in such a way so that snapshots of volumes 135 and 137 that represent the same volume state are given the same sequence number. However, it will be understood that the present disclosure is not limited to any specific method for tracking which snapshots of volumes 135 and 137 represent the same volume state.

Process 400 is advantageous over process 300 in that it requires much less bandwidth to synchronize the states of volumes 135 and 137 after a roll-back is performed on volume 135. Unlike process 300, which transmits a full-copy snapshot of volume 135 to storage system 134, process 400 transmits only an abbreviated snapshot (which may be the difference between a full-copy snapshot of volume 135 and another snapshot of volume 135). Under most circumstances, the abbreviated snapshot would have a much smaller size than the full-copy snapshot, and its transmission therefore requires a much smaller amount of network bandwidth.

FIG. 5 is a flowchart of a process 500, according to aspects of the disclosure. At step 502, storage system 133 creates clone 139 of volume 135. At step 504, clone 139 is updated. As noted above, the updates may include repairing data that is present in clone 139. At step 506, a snapshot of the clone is created. According to the present example, snapshot 140 (shown in FIG. 1A) is created. At step 508, volume 135 is updated based on the clone snapshot (created at step 506). At step 510, a PIT event is detected. At step 512, a full-copy snapshot of volume 135 is created. The full-copy snapshot may be the first snapshot of volume 135 that is created following the update at step 508. At step 514, a first snapshot of volume 135 is identified. The first snapshot may be any snapshots of volume 135 that is created before the update. In one example, the first snapshot may be the last snapshot of volume 135 that is created before volume 135 is updated (at step 508). In another example, the first snapshot may be any snapshot of volume 135 that is generated after the clone of volume 135 is created at step 502). Additionally or alternatively, in some implementations, the snapshot may be identified automatically (e.g., by selecting an identifier of the newest snapshot that was created at least 48 hours ago or by using any other suitable selection criterion). Additionally or alternatively, in some implementations, the first snapshot may be identified based on user input identifying the volume (e.g., a keyboard input or input received over a communications network that contains an identifier of the volume). Additionally or alternatively, in some implementations, the identified snapshot may be selected by the customer after the customer has inspected available snapshots in reverse creation order to find the latest non-corrupted snapshot.

At step 516, storage system 133 transmits to storage system 134 an instruction to roll back volume 137 based on a second snapshot of volume 137 that represents the same volume state as the first snapshot of volume 135. As noted above, the instruction may include the sequence number of the first snapshot and/or any other suitable information. The instruction may be executed by storage system 134 in the manner discussed above with respect to FIG. 4. At step 518, storage system 133 waits to receive a response to the instruction (transmitted at step 516) which confirms that volume 137 has been rolled back based on the second snapshot. If the response is received, process 500 proceeds to step 520. Otherwise, if the instruction times out (or if an error is detected), process 500 ends. At step 520, an abbreviated snapshot is created that is the same as (or otherwise based on) the difference between the first snapshot of volume 135 (identified at step 514) and the full-copy snapshot of volume 135 (generated at step 512). At step 522, the abbreviated snapshot is transmitted to storage system 134. When the abbreviated snapshot is received at storage system 134, volume 137 is updated based on the abbreviated snapshot.

Figure 6:
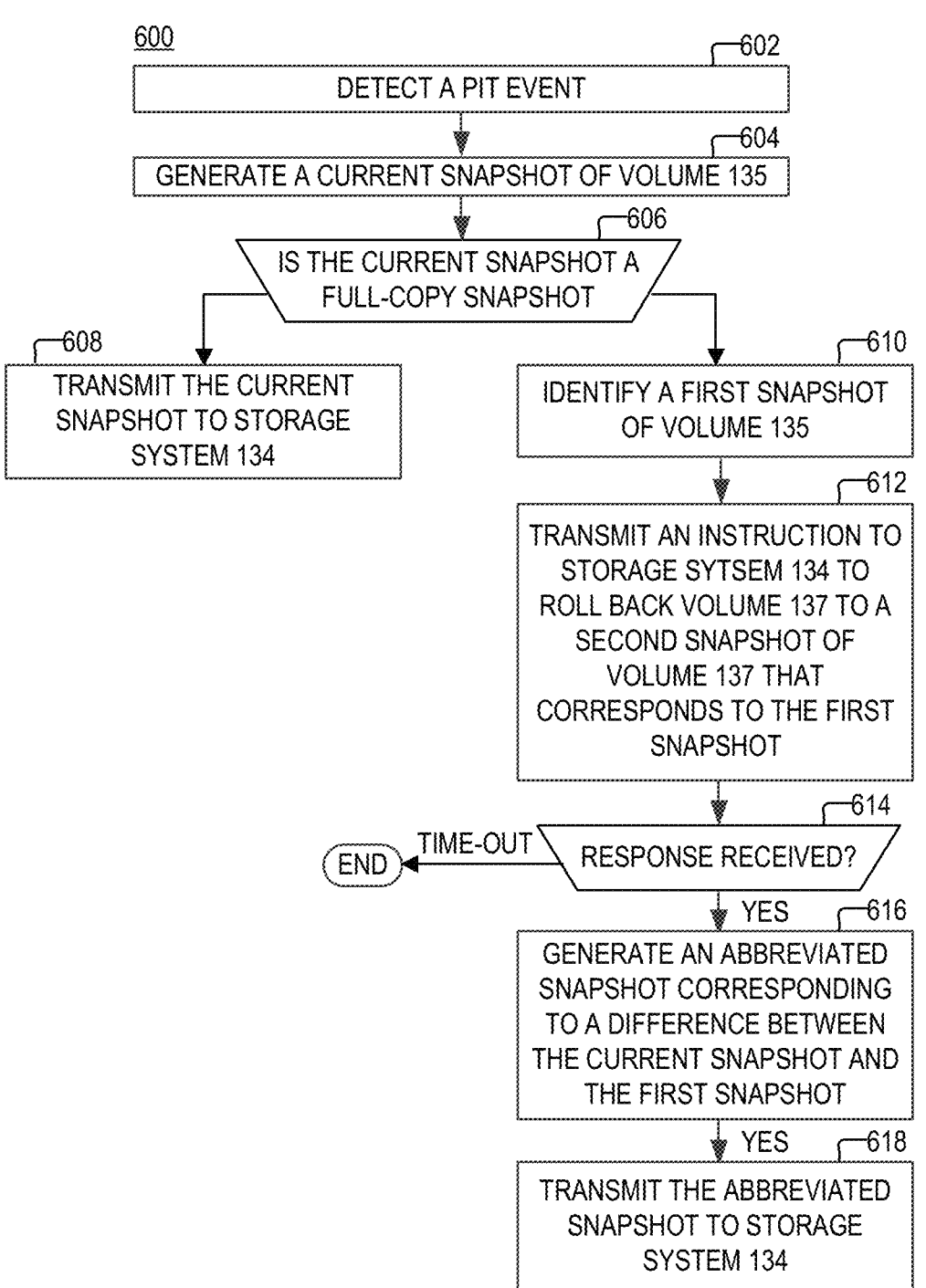
FIG. 6 is a flowchart of an example of a process, according to aspects of the disclosure.

FIG. 6 is a flowchart of an example of a process 600, according to aspects of the disclosure. At step 602, a PIT event is detected in storage system 133. At step 604, a snapshot of volume 135 is generated in response to the PIT event. The generated snapshot is herein referred to as "the current snapshot of volume 135". At step 606, storage system 133 detects whether the current snapshot is a full-copy or a delta-copy snapshot. If the current snapshot is delta-copy snapshot, process 600 proceeds to step 608. Otherwise, if the current snapshot is a full-copy snapshot, process 600 proceeds to step 610. At step 608, the current snapshot is transmitted to storage system 134. The current snapshot is subsequently processed by storage system 134 in the manner discussed above with respect to FIG. 2. At step 610, a first snapshot of volume 135 is identified. The first snapshot may be any snapshot that is generated before the current snapshot. In one example, the first snapshot may be the last snapshot of volume 135 that is generated before the current snapshot.

At step 612, storage system 133 transmits to storage system 134 an instruction to roll back volume 137 based on a second snapshot of volume 137 that represents the same volume state as the first snapshot of volume 135. In some implementations, the instruction may include a sequence number of the first snapshot and/or any other suitable type of identifier of the first snapshot. In some implementations, the instruction may be executed by storage system 134 in the manner discussed above with respect to FIG. 4. At step 614, storage system 133 waits to receive a response to the instruction (transmitted at step 612) which confirms that volume 137 has been rolled back based on the second snapshot. If the response is received, process 600 proceeds to step 616. Otherwise, if the instruction times out (or if an error is detected), process 600 ends. At step 616, an abbreviated snapshot is created that is the same as (or otherwise based on) the difference between the first snapshot of volume 135 (identified at step 404) and the full-copy snapshot of volume 135 (generated at step 410). At step 618, the abbreviated snapshot is transmitted to storage system 134. When the abbreviated snapshot is received at storage system 134, volume 137 is updated based on the abbreviated snapshot.

In some implementations, process 600 may be executed when a predetermined condition is true. In one example, the predetermined condition may be true before the initial snapshot of volume 135 (e.g. the snapshot generated at step 224) is created, and the predetermined condition may become true after the initial snapshot is transmitted to storage system 134. Additionally or alternatively, the predetermined condition may be true when the current snapshot of volume 135 (generated at step 604) is the first snapshot of volume 135 that is generated after volume 135 is rolled back based on an earlier snapshot of volume 135 (e.g., see FIG. 4). Additionally or alternatively, the predetermined condition may be true when the current snapshot of volume 135 (generated at step 604) is the first snapshot of volume 135 that is generated after volume 135 is updated based on the snapshot of a clone of volume 135 (e.g., see FIG. 5). Additionally or alternately, the predetermined condition may be true when a configuration setting of storage system 133 has a first value (e.g., '1') and false when the configuration setting has a second value (e.g., '0'). As can be readily appreciated, making the execution of process 600 contingent on the predetermined condition allows storage system 133 to pass a full-copy volume to storage system 134 when needed.

Additionally or alternatively, in some implementations, process 600 may branch to steps 610-618 (and generate and transmit an abbreviated snapshot) when the snapshot generated at step 604 is the first snapshot that is generated after a certain extraordinary event, such as the roll-back or update of a volume based on another snapshot. In all other circumstances, process 600 may branch to step 608, irrespective of whether the snapshot is a full-copy snapshot or not.

Figure 7:
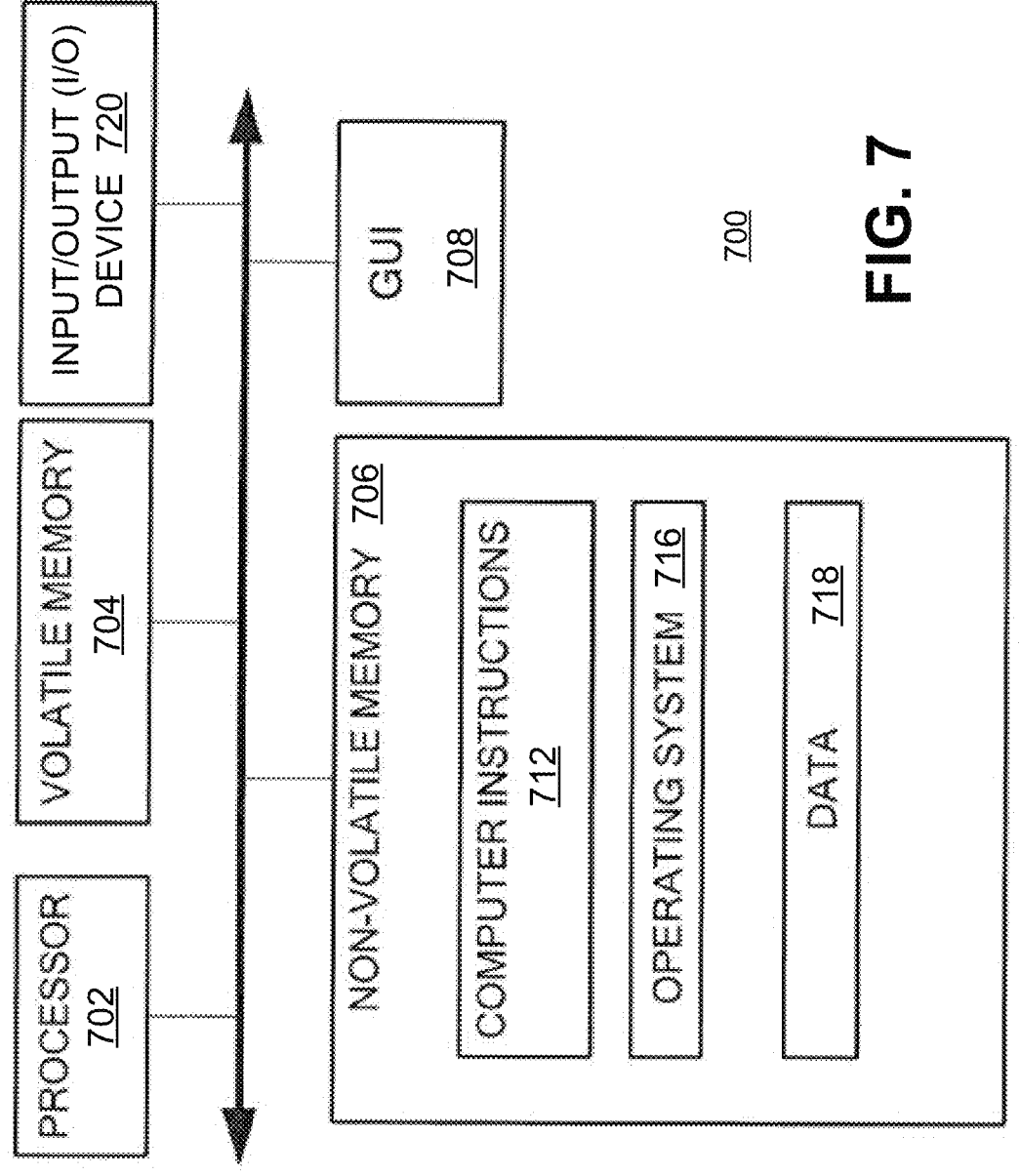
FIG. 7 is a diagram of an example of a computing device, according to aspects of the disclosure.

Referring to FIG. 7, in some embodiments, a device 700 may include processor 702, volatile memory 704 (e.g., RAM), non-volatile memory 706 (e.g., a hard disk drive, a solid-state drive such as a flash drive, a hybrid magnetic and solid-state drive, etc.), graphical user interface (GUI) 708 (e.g., a touchscreen, a display, and so forth) and input/output (I/O) device 720 (e.g., a mouse, a keyboard, etc.). Non-volatile memory 706 stores computer instructions 712, an operating system 716 and data 718 such that, for example, the computer instructions 712 are executed by the processor 702 out of volatile memory 704. Program code may be applied to data entered using an input device of GUI 708 or received from I/O device 720.

FIGS. 1-7 are provided as an example only. In some embodiments, the term "I/O request" or simply "I/O" may be used to refer to an input or output request. At least some of the steps discussed with respect to FIGS. 1-7 may be performed in a different order or altogether omitted. As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. The phrase "storage system performs task A" means that task A is performed by one or more nodes or computing devices that are part of storage system. Any of the tasks discussed with respect to FIGS. 2-6 may be performed by management system 132 alone or together with one or more computing devices that are part of storage system 133 or storage system 134. However, the present disclosure is not limited to any specific type of computing device (or set of computing devices) performing any of the steps that are discussed with respect to FIGS. 2-6. The examples provided with respect to FIGS. 2-6 are not mutually exclusive-rather, they are intended to complement each other.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method for use in a first storage system, comprising:
generating a current snapshot of a first volume that is hosted by the first storage system;
when the current snapshot is a full copy of the first volume and a predetermined condition is true: identifying a first snapshot of the first volume, generating an abbreviated snapshot of the first volume corresponding to a difference between the first snapshot and the current snapshot, transmitting to a second storage system an instruction to roll back a second volume to a second snapshot of the second volume that corresponds to a same volume state as the first snapshot, waiting to receive a confirmation that the second volume has been rolled back, and transmitting the abbreviated snapshot to the second storage system for use in updating the second volume; and
when the current snapshot is not a full copy of the first volume and/or the predetermined condition is not true: transmitting the current snapshot to the second storage system,
wherein the second volume is a copy of the first volume, and the second volume is hosted by the second storage system and synchronized with the first volume by using snapshots of the first volume that are generated by the first storage system and subsequently transmitted to the second storage system,
wherein the predetermined condition is true at least when the first volume is rolled back based on the first snapshot, and the current snapshot is generated after the roll-back.

2. The method of claim 1, wherein the predetermined condition is true when the current snapshot is other than an initial snapshot of the volume.

3. The method of claim 1, wherein the second snapshot is a copy of the first snapshot that is stored locally at the second storage system.

4. The method of claim 1, wherein the instruction includes a sequence number of the first snapshot.

5. The method of claim 1, wherein the second snapshot is a snapshot that is generated locally in the second storage system after the second volume is updated based on the first snapshot and before any further updates are made to the second volume.

6. A system, comprising:
a memory; and
at least one processor that is operatively coupled to the memory, the at least one processor being configured to perform the operations of:
generating a current snapshot of a first volume that is hosted by a first storage system;
when the current snapshot is a full copy of the first volume and a predetermined condition is true: identifying a first snapshot of the first volume, generating an abbreviated snapshot of the first volume corresponding to a difference between the first snapshot and the current snapshot, transmitting to a second storage system an instruction to roll back a second volume to a second snapshot of the second volume that corresponds to a same volume state as the first snapshot, waiting to receive a confirmation that the second volume has been rolled back, and transmitting the abbreviated snapshot to the second storage system for use in updating the second volume; and
when the current snapshot is not a full copy of the first volume and/or the predetermined condition is not true: transmitting the current snapshot to the second storage system,
wherein the second volume is a copy of the first volume, and the second volume is hosted by the second storage system and synchronized with the first volume by using snapshots of the first volume that are generated by the first storage system and subsequently transmitted to the second storage system,
wherein the predetermined condition is true at least (i) when the first volume is rolled back based on the first snapshot and the current snapshot is generated after the roll-back and/or (ii) when the first volume is updated based on a snapshot of a clone of the first volume, the first snapshot is any snapshot that is generated before the update, and the current snapshot is generated after the update.

7. The system of claim 6, wherein the predetermined condition is true when the current snapshot is other than an initial snapshot of the volume.

8. The system of claim 6, wherein the second snapshot is a copy of the first snapshot that is stored locally at the second storage system.

9. The system of claim 6, wherein the instruction includes a sequence number of the first snapshot.

10. The system of claim 6, wherein the second snapshot is a snapshot that is generated locally in the second storage system after the second volume is updated based on the first snapshot and before any further updates are made to the second volume.

11. A method for use in a first storage system, comprising:
generating a current snapshot of a first volume that is hosted by the first storage system, when the current snapshot is a full copy of the first volume and a predetermined condition is true; identifying a first snapshot of the first volume generating an abbreviated snapshot of the first volume corresponding to a difference between the first snapshot and the current snapshot, transmitting to a second storage system an instruction to roll back a second volume to a second snapshot of the second volume that corresponds to a same volume state as the first snapshot, waiting to receive a confirmation that the second volume has been rolled back, and transmitting the abbreviated snapshot to the second storage system for use in updating the second volume; and when the current snapshot is not a full copy of the first volume and/or the predetermined condition is not true transmitting the current snapshot to the second storage system, wherein the second volume is a copy of the first volume, and the second volume is hosted by the second storage system and synchronized with the first volume by using snapshots of the first volume that are generated by the first storage system and subsequently transmitted to the second storage system, wherein the predetermined condition is true at least when the first volume is updated based on a snapshot of a clone of the first volume, the first snapshot is any snapshot that is generated before the update, and the current snapshot is generated after the update.

* * * * *